United States Patent
Fisher et al.

(10) Patent No.: US 8,617,451 B2
(45) Date of Patent: Dec. 31, 2013

(54) METHOD OF PRODUCING GYPSUM BUILDING BOARDS

(75) Inventors: Robin Fisher, Loughborough (GB); Henri van Damme, Olivet (FR)

(73) Assignee: BPB Limited, Coventry (GB)

( * ) Notice: Subject to any disclaimer, the term of this patent is extended or adjusted under 35 U.S.C. 154(b) by 609 days.

(21) Appl. No.: 12/783,164

(22) Filed: May 19, 2010

(65) Prior Publication Data

US 2011/0031652 A1 Feb. 10, 2011

(30) Foreign Application Priority Data

Nov. 30, 2007 (GB) .................................. 0723442.0
Nov. 11, 2008 (WO) ................. PCT/GB2008/051047
May 20, 2009 (GB) .................................. 0908650.5

(51) Int. Cl.
*B28B 1/14* (2006.01)

(52) U.S. Cl.
USPC ........ 264/333; 264/297.9; 264/332; 264/414; 264/426; 264/430; 524/2

(58) Field of Classification Search
USPC .............. 264/332, 333, 297.9, 414, 426, 430; 524/2
See application file for complete search history.

(56) References Cited

U.S. PATENT DOCUMENTS

| | | | | |
|---|---|---|---|---|
| 4,514,471 A * | 4/1985 | Sugimoto et al. | ............. | 428/703 |
| 5,482,551 A * | 1/1996 | Morris et al. | ................. | 106/772 |
| 6,527,850 B2 | 3/2003 | Schwartz et al. | | |
| 6,869,988 B2 | 3/2005 | Schwartz et al. | | |
| 7,052,773 B2 | 5/2006 | Bacher et al. | | |
| 7,053,125 B2 * | 5/2006 | Lewis et al. | ..................... | 516/90 |
| 7,070,648 B1 | 7/2006 | Schwartz et al. | | |
| 7,261,772 B1 | 8/2007 | Schwartz et al. | | |
| 2002/0058739 A1* | 5/2002 | Lorah et al. | .................... | 524/445 |
| 2002/0121229 A1* | 9/2002 | Jardine et al. | ................. | 106/681 |
| 2008/0087198 A1* | 4/2008 | Schwartz et al. | ............. | 106/774 |

* cited by examiner

*Primary Examiner* — Timothy Kennedy
(74) *Attorney, Agent, or Firm* — Gordon & Jacobson, PC

(57) ABSTRACT

A method of producing gypsum building board, in which there is added, to an aqueous gypsum slurry containing a water swellable clay, a basic water-soluble polymer having preferential affinity for clay. The slurry is allowed to set so as to form a board. The basic water-soluble polymer may be, for example, a polyvinyl alcohol or a polymer consisting essentially of carbon, nitrogen and hydrogen and having amine groups (which may be primary, secondary, tertiary or quaternary) in the polymer backbone and/or in side chains thereof.

15 Claims, 2 Drawing Sheets

Comparison of Poly(DADMAC), poly allyl amine of two molecular weights, and polyethyleneimine

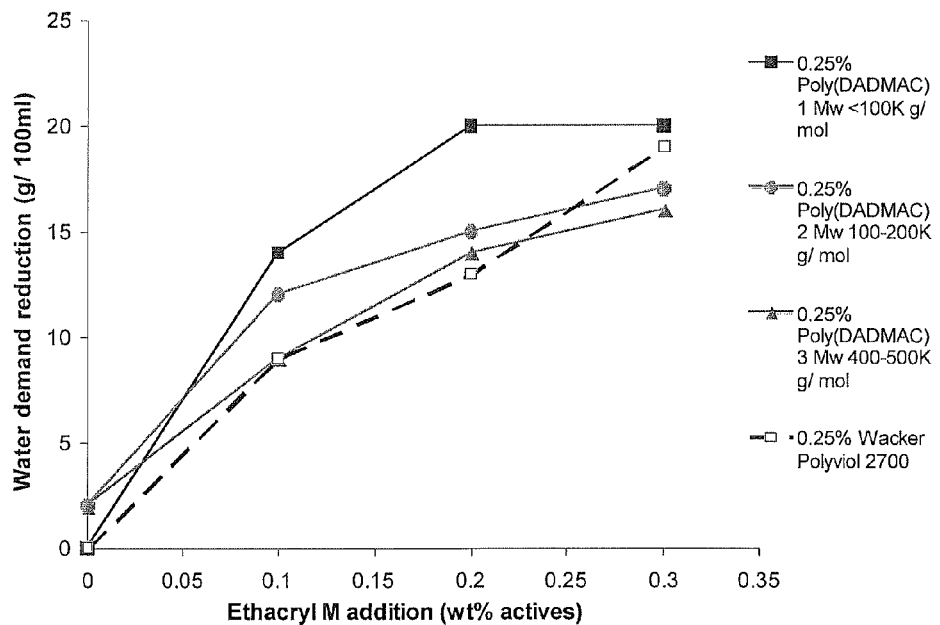
Figure 1 – Comparison of Poly(DADMAC) of differing molecular weights and polyvinyl alcohol.
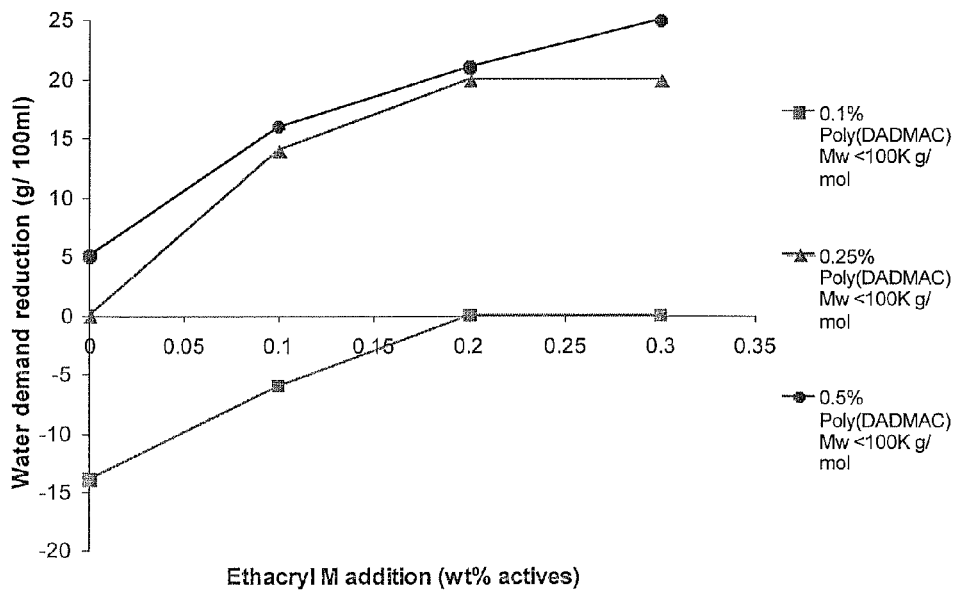
Figure 2 – Comparison of Poly(DADMAC) addition levels at the molecular weight of <100 g/ mol.

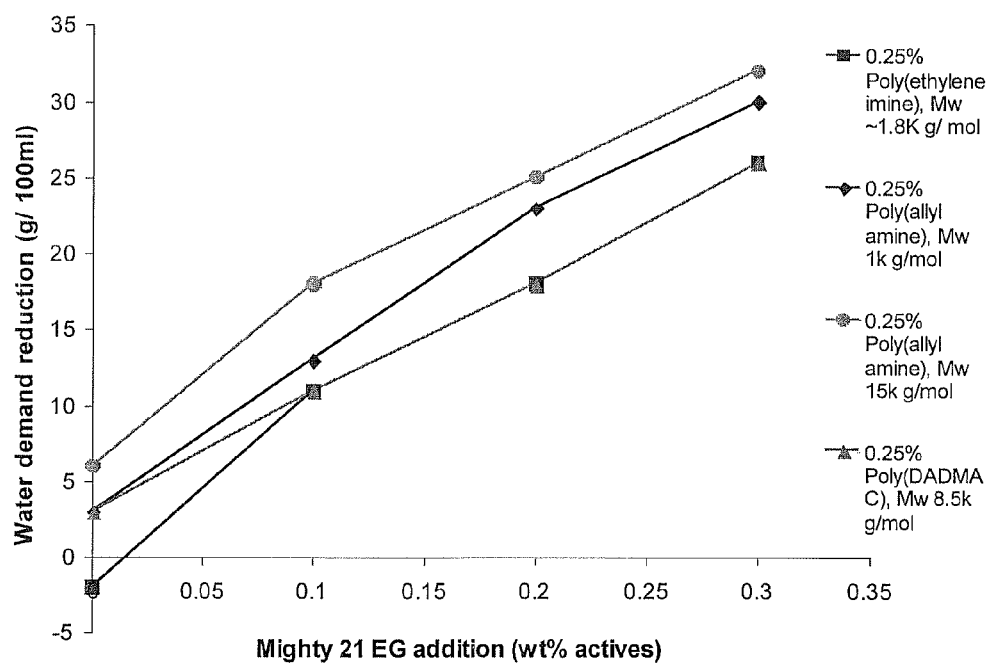
Figure 3 – Comparison of Poly(DADMAC), poly allyl amine of two molecular weights, and polyethyleneimine

METHOD OF PRODUCING GYPSUM BUILDING BOARDS

CROSS-REFERENCE TO RELATED APPLICATIONS

The present application claims priority from International Patent Appl. No. PCT/GB2008/051047, filed Nov. 11, 2008, which claims priority from United Kingdom application 0723442.0, dated Nov. 30, 2007, both of which are herein incorporated by reference in their entireties. The present application further claims priority from United Kingdom patent application 0908650.5, dated May 20, 2009, herein incorporated by reference in its entirety.

BACKGROUND OF THE INVENTION

1. Field of the Invention

The present invention concerns the production of gypsum building boards.

2. Related Art

Gypsum building boards are well known and are frequently provided in surface reinforced form. Examples of such building boards include plasterboard (which is generally reinforced with paper liners) and gypsum board (which may be reinforced at or near the surface by a woven or non-woven reinforcement, or solely reinforced in its core).

Gypsum board is generally produced by shaping gypsum stucco slurry (and optionally fiber reinforcement), through an extruder or between rollers or belts. For surface reinforced gypsum board, the gypsum slurry is sandwiched between surface reinforcements before shaping. In this arrangement, the edges of the surface reinforcement or liner sheets are typically sealed together. After shaping of the gypsum board, the wet slurry is allowed to set and the set board is cut into desired lengths and dried to form the final board.

It has been found that water-swellable clays present in some natural sources of gypsum tend to increase the water demand of the slurry which ultimately forms the plaster, by forming a flocculated structure in the presence of calcium ions.

It has been proposed in U.S. Pat. No. 7,261,772 (Schwartz et al) to add to such clays a comb-branched copolymer that is formed from a polyether having terminal unsaturated groups, for example by polymerizing a polyether macromonomer having a polyalkylene oxide chain, reacted with an unsaturated monomer such as acrylic acid or methacrylic acid. The polyalkylene oxide is typically derived from ethylene oxide, propylene oxide, butylenes oxide or the like; for example a polyethylene glycol or polypropylene glycol, or random or block copolymers thereof. The above US patent suggests that certain amine compounds are necessary in the gypsum composition—specifically mentioned are aliphatic amines, quaternary amines, alkoxylated amines and amine oxides.

SUMMARY OF THE INVENTION

The present invention provides an improved method of producing gypsum board from gypsum slurry containing a water-swellable clay, in which there is further added to the gypsum slurry a comb-branched copolymer and a basic (non-acidic) water-soluble polymer having preferential affinity for the clay. The basic water soluble polymer is used instead of the amine compounds specified in the abovementioned U.S. Pat. No. 7,261,772.

The inventors of the present application have found that clays present in gypsum interfere with the action of comb-branched polymer fluidizers, lowering the dose efficiency of such fluidizers. The latter fluidizers become preferentially adsorbed onto clays because the fluidizers are more highly charged. The basic water-soluble polymers present in the gypsum slurry can preferentially adsorb onto clay present in the slurry, thereby performing two functions, as follows:

1) to disperse the clay particles, which lowers the water gauge slightly; and
2) to block the sites which would otherwise be occupied by added fluidizer, such blocking allowing the fluidizer to perform its desired function of fluidizing the plaster particles, which in turn results in further lowering of the water gauge.

Additional objects and advantages of the invention will become apparent to those skilled in the art upon reference to the detailed description taken in conjunction with the provided figures.

BRIEF DESCRIPTION OF THE DRAWINGS

FIG. 1 is a graph illustrating reduction in water demand for a gypsum slurry employing Poly(DADMAC) polymer additives of varying molecular weight in conjunction with varying concentration of Ethacryl M comb-based copolymer.

FIG. 2 is a graph illustrating reduction in water demand for a gypsum slurry employing varying concentration of a Poly (DADMAC) polymer additive of a molecular weight <100 g/mol in conjunction with varying concentration of Ethacryl M comb-based copolymer.

FIG. 3 is a graph illustrating reduction in water demand for a gypsum slurry employing different basic water-soluble polymer additives of the present invention in conjunction with varying concentration of Mighty 21 EG comb-based copolymer.

DETAILED DESCRIPTION OF THE INVENTION

Examples of basic water-soluble polymers suitable for use according to the invention include polyvinyl pyrrolidone, polyvinyl alcohol (either fully or partially hydrolyzed), and certain cold water soluble starch derivatives (such as oxidized, dextrinized or ethylated starch).

When a polyvinyl alcohol is used, the latter may typically be about 88% hydrolyzed. In some embodiments, the polyvinyl alcohol may be silanized—for example, by reaction of the hydroxyl groups in PVA with silanol functional groups. Suitable examples of such silanized polyvinyl alcohols are hydrolyzed vinyl ester polymers having a degree of hydrolysis of from 75 to 100% of the vinyl ester groups, and a content of silane-containing co-monomer units of from 0.01 to 10 mol %. Such silanized polyvinyl alcohols are disclosed in detail in U.S. Pat. No. 7,052,773.

Further examples of basic water-soluble polymers suitable for use according to the invention include certain hydrophilic basic water-soluble polymers consisting essentially of carbon, nitrogen and hydrogen and having amine groups (which may be primary, secondary, tertiary or quaternary) in the backbone and/or in the side chain, the water-soluble polymer having preferential affinity for clay.

The basic water-soluble polymer of the invention may be cationically charged, with quaternary ammonium groups or secondary or tertiary amine groups in main chains, branch chains, or pendant groups. When the polymers contain primary amine groups, the latter are in pendant groups.

In a first illustrative embodiment of the invention, the basic water-soluble polymer of the invention contains amine groups consisting of ones derived from monomers having a single polymerizable entity per molecule (such as an olefinic bond or a cleavable heterocyclic ring), the remainder of the monomer being preferably saturated. Preferably in such monomers, the amine is a primary or secondary group.

In a second illustrative embodiment of the invention, the basic water-soluble polymer contains secondary or tertiary amine groups in the backbone when polymerized, such as a polyethyleneimine type polymer (which will also have amine groups in side chains). When such a polyethyleneimine polymer is employed according to the invention, it is preferred that the average molecular weight thereof is less than about 10,000, especially less than about 3,000. Such polymers may result in advantageous foam stability in addition to lowered water gauge.

Polyethylene imine typically has the following structure, showing that the polymer generally contains secondary and tertiary amine groups in the backbone, and primary, secondary and tertiary groups in side chains.

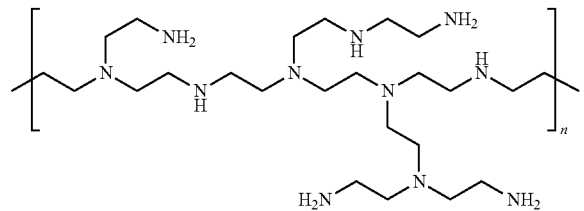

Polyvinyl amine, poly allyl amine and polyvinyl pyridine are further preferred examples of such basic water-soluble polymers of the invention, the polyvinyl pyridine typically being in quaternary form.

The basic water-soluble polymer of the invention may contain pendant amine or quaternary ammonium groups, an example of such a polymer being a poly-, mono- or di-olefinically substituted amine, such as an allyl amine type polymer or a polymer of crotyl amine, of a methylallyl amine, of a cinnamyl amine or the like.

In a third illustrative embodiment of the invention, the basic water-soluble polymer contains amine groups that include poly(diallyldialkyl ammonium) halides. The latter polymer preferably has a mean molecular weight of less than 200 kdaltons, such as not more than 100 kdaltons. Poly(diallylalkylamine) polymers are, however, less preferred.

It is preferred that any anionic species in the basic water-soluble polymer of the invention are compatible with gypsum and cause substantially no deleterious interaction therewith. It is further preferred that such ionic species do not form hydrated forms. In some embodiments, therefore it is preferred that the basic water-soluble polymer of the invention should be free of chloride ions, an example of such a polymer being a polyvinyl pyrrolidone, polyvinyl alcohol, cold water soluble starch derivative, polyethylene imine or a poly allyl amine as indicated above.

The basic water-soluble polymer of the invention has preferential affinity for the clay (relative to the comb-branched copolymer) and is capable of bonding to the clay, thereby helping to disperse the clay and inhibiting deleterious interaction with the comb-branched copolymer fluidizer. This effect helps to improve the dose efficiency of the fluidizer. It is an advantage of the present invention that polyoxyalkylenes can be omitted, as such polymers generally require use in combination with an amine compound as specified in the abovementioned U.S. Pat. No. 7,261,772.

The basic water-soluble polymer of the invention is preferably soluble in cold water, such as water having a temperature of no more than 30° C. (preferably at an ambient temperature of no more than 20° C.), such that the polymer can be supplied as an aqueous solution and/or mixed on site, without the need for an extra step to dissolve the polymer in hot water before addition to a slurry mixer.

A preferred concentration of such basic water-soluble polymer is from 0.1 to 2 grams per gram of clay present in the slurry.

When added to gypsum slurry, the basic water-soluble polymer of the invention can perform several functions simultaneously, the most significant being the following:

1) to disperse the clay allow a reduction in water demand, and 2) to increase the efficiency of comb-based copolymer based fluidizers allowing a reduction in water demand.

In some embodiments, the basic water-soluble polymer of the invention can also aid foaming, and can increase paper-gypsum adhesion after drying.

The comb-based copolymer fluidizer is preferably present in an amount of 0.005 to 1% based on the total weight of the slurry. In the preferred embodiment, the comb-based copolymer fluidizer is formed from a polyether having terminal unsaturated groups, for example by polymerizing a polyether macromonomer having a polyalkylene oxide chain, reacted with an unsaturated monomer such as acrylic acid or methacrylic acid. The polyalkylene oxide is typically derived from ethylene oxide, propylene oxide, butylenes oxide or the like; for example a polyethylene glycol or polypropylene glycol, or random or block copolymers thereof. Details of methodologies for producing such a comb-based copolymer fluidizer is set forth in U.S. Pat. Nos. 6,527,850, 6,869,988, 7,070,648 and 7,261,772, herein incorporated by reference in their entireties.

In an illustrative embodiment, the basic water-soluble polymer and/or the comb-based copolymer may each be added to a whipped aqueous foam to be mixed with a gypsum slurry, such an aqueous foam being produced by foaming water containing at least one foaming agent. Polyethyleneimines and polyvinyl alcohols are, as indicated above, advantageous water-soluble polymers, especially when such a whipped aqueous foam is employed.

When an aqueous foam is used in the method according to the invention, the resulting board is lighter because it contains air bubbles, as is well known.

The water present in such a foam is typically ground water or tap water, which may have been filtered. Other non-deleterious materials, adjuvants and ingredients may, when appropriate, be present in the water from which the foam is made.

The gypsum slurry which is mixed with the whipped aqueous foam comprises hydratable gypsum (calcium sulfate), which has generally been obtained by gypsum calcination. The slurry may contain other non-deleterious mineral materials and/or ions such as phosphate and/or magnesium ions. The hydratable calcium sulfate may be, for example, anhydrous calcium sulfate (anhydrite II or III) or a calcium sulfate hemihydrate ($CaSO_4.0.5H_2O$) in its alpha- or beta-crystalline form.

The gypsum is typically mixed with water to form a slurry, before mixing with the aqueous foam described above; the water from which the slurry is made is typically ground water or tap water, which may have been filtered. Other non-deleterious materials, adjuvants and ingredients may, when appropriate, be present in the water from which the slurry is made.

The pH of the slurry is typically in the range 6.5 to 9.5, and the slurry may contain optional further ingredients, such as starch, water reducing agents, moisture repellents (such as silicone oils or waxes), reinforcing fibers, set accelerators and retarders, deformation inhibitors (such as anti-sagging agents), anti-shrink additives, recalcination inhibitors, foam stabilizers, levelling aids, bactericides, fungicides, pH adjusters, coloring agents, fire retardants and fillers (such as particulate mineral material or plastics, which may in some embodiments be in expanded form).

In the production of gypsum board according to the invention, the slurry may contain fiber reinforcement, such as glass fibers (typically cut fibers). The gypsum board produced according to the invention may be with or without surface reinforcement or liner sheets. When surface reinforcement is used, it may, for example, be of fiber scrim or fiber mesh.

When gypsum building board is produced according to the invention, the gypsum slurry as described herein is preferably formed to a desired thickness by extrusion or pressing between rollers or belts by methods generally known to those skilled in the art. Preferably the slurry (optionally and preferably containing fiber reinforcement) is fed between spaced surface reinforcements so as to form a sandwich structure, and the slurry is allowed to set between the surface reinforcements.

The present invention extends to gypsum building board comprising a set aqueous gypsum slurry containing a water swellable clay, a comb-based copolymer fluidizer and a basic water-soluble polymer having preferential affinity for clay, the water-soluble polymer being as set out above.

Certain aspects and features of the present invention will now be illustrated by the following worked examples, in which reference will also be made to the accompanying drawings, wherein FIGS. 1 to 3 graphically show results obtained according to the invention, and also comparative results.

Example 1

150 g of DSG (desulphogypsum) stucco to which had been added 1.5% by weight Wyoming bentonite (a naturally swelling clay) was used in each test except the control—in the latter no clay was added.

Water at 40° C. was added in the weighed amount into a small Waring blender and 0.1% trisodium citrate (w/w stucco) as retarder was added to the blend along with solid additives, and the blender was operated for 10 seconds to dissolve the retarder.

Ethacryl M (a commercially available comb-based copolymer which is an ethoxylated acrylic acid polymer) from LyondellBasell and other liquid additives as appropriate were added at this stage. Then, the stucco was sprinkled onto the solution over 30 seconds and left to stand for 30 seconds. Mixing time was 10 seconds on low speed. The slump diameter of the slurry was measured on the falling plate consistometer as described in Section C.3.1.1 of BS 1191: Part 1: 1973.

The results summarized in the following Table 1 show the advantageous increased fluidity achieved by adding a comb-based polymer to an exemplary stucco that contains clay. In this case the clay was deliberately added in order to provide experimental control, but similar effects are achieved with stucco which naturally contains water-swellable clay. The proportions of Ethacryl specified are the active contents.

TABLE 1

| Stucco | Clay modifier | Addition (wt % actives on stucco) | Water gauge for a 58-60 mm slump (g/100 g) | Slump diameter (mm) 0.1% Ethacryl | 0.2% Ethacryl |
|---|---|---|---|---|---|
| Contains clay | None | 0 | 80 | 55 | 63 |
| Contains clay | Partially hydrolyzed polyvinyl alcohol - DuPont Elvanol 51-04 L24 | 0.25 | 76 | 80 | 85 |
| Contains clay | Silanized partially hydrolyzed polyvinyl alcohol - Wacker Polyviol 2700 | 0.25 | 79 | 76 | 88 |
| Contains clay | White dextrin - Avebe Avedex W35 | 0.25 | 80 | 65 | 75 |
| Control (no clay) | None | 0 | 81 | 87 | 95 |

Example 2

Example 1 was repeated, replacing the 150 g of DSG by 200 g of a natural gypsum known to contain clay in each test.

The mixing water level was adjusted to achieve a certain consistency given by the slump diameter. Once 2 repeats were within the range of 58-60 mm, the level of water was noted as 'water demand'.

The clay modifiers were poly DADMAC 1 (with a molecular weight of approx 100K); poly DADMAC 2 (with a molecular weight of 100 to 200K); poly DADMAC 3 (with a molecular weight of 400 to 500K); and silanized partially hydrolyzed polyvinyl alcohol—Wacker Polyviol 2700 (Polyviol).

The results summarized in the following Table 2 show the advantageous reduced water demand achieved by adding a comb-based polymer and a cationically charged polymer to an exemplary stucco that contains clay. Water demand reduction=(Water demand from control with no comb-based polymer or clay modifier−Water demand from given formulation).

TABLE 2

| Clay modifier | Addition (wt % actives on stucco) | Water demand reduction (g/100 g) | | | |
|---|---|---|---|---|---|
| | | 0 wt % Ethacryl | 0.1 wt % Ethacryl | 0.2 wt % Ethacryl | 0.3 wt % Ethacryl |
| Poly(DADMAC)1, Mw < 100k g/mol | 0.25 | 0 | 14 | 20 | 20 |
| Poly(DADMAC)2, Mw 100-200k g/mol | 0.25 | 2 | 12 | 15 | 17 |
| Poly(DADMAC)3, Mw 400-500k g/mol | 0.25 | 2 | 9 | 14 | 16 |
| Silanised partially hydrolysed polyvinyl alcohol - Wacker Polyviol 2700 | 0.25 | 0 | 9 | 13 | 19 |

The above results details are summarized in FIG. 1 of the accompanying drawings. FIG. 2 of the accompanying drawings is similar, but shows varying amounts of Poly(DADMAC) 1—namely 0.1%, 0.25% and 0.5%, respectively.

FIG. 2 shows that water demand values were substantially reduced for amounts of Poly(DADMAC) 1 of 0.25% or more. This shows that it is desirable for this particular stucco to include the polymer in an amount exceeding 0.1%, such as at least about 0.2% by weight. The amount depends on the amount of clay in the stucco.

Example 3

Example 2 was repeated using as the stucco a second natural gypsum known to contain clay, and the Ethacryl replaced by "Mighty 21 EG" which is a comb-based copolymer commercially available from Kao.

The results summarized in the following Table 3 show the advantageous reduced water demand achieved by adding a comb-based polymer and a polyethyleneimine or poly allyl amine to exemplary gypsum stucco slurry that contains clay.

TABLE 3

| Clay modifier | Addition (wt % actives on stucco) | Water demand reduction (g/100 g) | | | |
|---|---|---|---|---|---|
| | | 0 wt % Mighty | 0.1 wt % Mighty | 0.2 wt % Mighty | 0.3 wt % Mighty |
| Poly(ethyleneimine) with a solution average Mw of approx 1800 | 0.25 | −2 | 11 | 18 | 26 |
| Poly allyl amine Mw 1,000 | 0.25 | 3 | 13 | 23 | 30 |
| Poly allyl amine Mw 15,000 | 0.25 | 6 | 18 | 25 | 32 |
| Poly(DADMAC) Mw 8,500 | 0.25 | 3 | 11 | 18 | 26 |

The above results details are summarized in FIG. 3 of the accompanying drawings. FIG. 3 shows that water demand values were substantially reduced for a clay-containing gypsum containing the specified polymers in the amounts indicated.

There have been described and illustrated herein several embodiments of a method of producing gypsum building boards. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A method of producing gypsum building board, the method comprising:
   (a) providing an aqueous gypsum slurry containing a water swellable clay, in which there is further added to the gypsum slurry a comb-based copolymer fluidizer and a basic water-soluble polymer having preferential affinity for clay, wherein the basic water-soluble polymer is selected from the group consisting of: i) polyvinyl pyrrolidone, ii) polyvinyl alcohol, iii) polyethyleneimine, iv) polyvinyl amine, v) polyallyl amine, vi) poly(diallyldimethylammonium halide); and
   (b) allowing a layer of the aqueous gypsum slurry to set so as to form a board.

2. A method according to claim 1, wherein:
the basic water-soluble polymer comprises polyvinyl alcohol that is partially silanized.

3. A method according to claim 1, wherein:
the basic water-soluble polymer comprises a polyethyleneimine.

4. A method according to claim 1, wherein:
the basic water-soluble polymer comprises a polyallyl amine.

5. A method according to claim 1, wherein:
the basic water-soluble polymer is cationically charged.

6. A method according to claim 5, wherein:
the basic water-soluble polymer comprises a poly(diallyldimethylammonium halide).

7. A method according to claim 1, wherein:
the basic water-soluble polymer is soluble in water having a temperature not exceeding 20° C.

8. A method according to claim 1, wherein:
the comb-based copolymer fluidizer comprises a polymer of a polyalkoxylated acrylic or methacrylic acid.

9. A method according to claim 1, wherein:
the slurry is fed between spaced surface reinforcements so as to form a sandwich structure and the slurry is allowed to set between the surface reinforcements.

10. A method according to claim 9, wherein:
the slurry contains fiber reinforcement.

11. A method according to claim 1, wherein:

the basic water-soluble polymer is soluble in water having a temperature not exceeding 20° C.

12. A method according to claim 1, wherein:

the comb-based copolymer fluidizer comprises a polymer of a polyalkoxylated acrylic or methacrylic acid.

13. A method according to claim 1, wherein:

the slurry is fed between spaced surface reinforcements so as to form a sandwich structure and the slurry is allowed to set between the surface reinforcements.

14. A method according to claim 13, wherein:

the slurry contains fiber reinforcement.

15. A method according to claim 1, wherein:

the basic water-soluble polymer has a preferential affinity for clay relative to that of the comb-based copolymer fluidizer.

* * * * *